(12) United States Patent
Tulyakov et al.

(10) Patent No.: US 8,005,277 B2
(45) Date of Patent: Aug. 23, 2011

(54) SECURE FINGERPRINT MATCHING BY HASHING LOCALIZED INFORMATION

(75) Inventors: Sergey Tulyakov, Williamsville, NY (US); Faisal Farooq, Williamsville, NY (US); Sharat Chikkerur, Amherst, NY (US); Venu Govindaraju, Williamsville, NY (US)

(73) Assignee: Research Foundation-State University of NY, Amherst, NY (US)

( * ) Notice: Subject to any disclaimer, the term of this patent is extended or adjusted under 35 U.S.C. 154(b) by 1163 days.

(21) Appl. No.: 11/713,123

(22) Filed: Mar. 2, 2007

(65) Prior Publication Data
US 2007/0253608 A1 Nov. 1, 2007

Related U.S. Application Data

(60) Provisional application No. 60/779,121, filed on Mar. 3, 2006.

(51) Int. Cl.
*G06K 9/00* (2006.01)
(52) U.S. Cl. .......................................... 382/125
(58) Field of Classification Search .......... 382/124–127; 340/5.53, 5.83
See application file for complete search history.

(56) References Cited

U.S. PATENT DOCUMENTS

| | | | | |
|---|---|---|---|---|
| 5,680,460 | A | 10/1997 | Tomko et al. | 380/23 |
| 5,712,912 | A | 1/1998 | Tomko et al. | 380/23 |
| 5,790,668 | A | 8/1998 | Tomko | 380/25 |
| 6,219,794 | B1 | 4/2001 | Soutar et al. | 713/202 |
| 2003/0091218 | A1* | 5/2003 | Hamid | 382/124 |
| 2003/0202687 | A1* | 10/2003 | Hamid et al. | 382/124 |
| 2003/0223624 | A1* | 12/2003 | Hamid | 382/124 |
| 2005/0105783 | A1* | 5/2005 | Moon et al. | 382/124 |
| 2006/0078171 | A1* | 4/2006 | Govindaraju et al. | 382/115 |

OTHER PUBLICATIONS

Tulyakov et al. "Symmetric Hash Functions for Fingerprint Minutiae." International Workshop on Patter Recognition for Crime Prevention, Security and Surveillance, Bath U.K., Oct. 2, 2005, pp. 30-38.*
Ratha et al., "Enhancing Security and Privacy in Biometrics-based Authentication System", IBM Systems Journal, vol. 40, No. 3, pp. 614-634, 2001.
A. Juels and M. Sudan, "A fuzzy vault scheme," in IEEE International Symposium on Information Theory, 2002.
A. Juels and M. Wattenberg, "A fuzzy commitment scheme," in ACM Conference on Computer and Communications Security, 1999,pp. 28-36.
Y. Kuan, A. Goh, D. Ngo, and A. Teoh, "Cryptogrpahic keys from dynamic hand-signatures with biometric secrecy preservation and replaceability," in Auto ID 2005, Fourth IEEE Workshop on Automatic Identification, Advanced Technologies, 2005,pp. 27-32.
C. Soutar, D. Roberge, A. Stoianov, R. Gilroy, and V. Kumar, "Biometric encryption," in ICSA Guide to Cryptography, R. Nichols, Ed. McGraw-Hill, 1999.
V. Govindaraju, "Advances in Fingerprint Recognition at CUBS", Allied Publishers Pvt. Ltd., Proceedings of the International Workshop on Document Analysis, Mar. 2005, pp. 149-174.

* cited by examiner

*Primary Examiner* — Jon Chang
(74) *Attorney, Agent, or Firm* — Simpson & Simpson, PLLC

(57) ABSTRACT

A method and apparatus for obtaining, hashing, storing and using fingerprint data related to fingerprint minutia including the steps of: a) determining minutia points within a fingerprint, b) determining a plurality of sets of proximate determined minutia points, c) subjecting a plurality of representations of the determined sets of minutia points to a hashing function, and d) storing or comparing resulting hashed values for fingerprint matching.

18 Claims, 5 Drawing Sheets

SECURE FINGERPRINT MATCHING BY HASHING LOCALIZED INFORMATION

CROSS-REFERENCE TO RELATED APPLICATION

This application claims the benefit under 35 U.S.C. §119(e) of U.S. Provisional Application No. 60/779,121, filed Mar. 3, 2006.

FIELD OF THE INVENTION

This invention relates to biometrics, i.e. the study of measurable biological characteristics, and more particularly relates to establishment of the identity of an individual through his or her physiological characteristics and more especially relates to secure archiving of fingerprint information and its use for comparative identification.

BACKGROUND OF THE INVENTION

Biometrics presents an accurate method for personal identification and authentication. Biometric data that may be used for identification and authentication include, but are not limited to: facial characteristics; fingerprints; hand geometry; capillary arrangement in the retina; iris ring color; signature; vein arrangement, e.g. on the back of the hand; voice tone, pitch, cadence and frequency patterns; and DNA structure. Especially useful is fingerprint information in that to date no two individuals have been found having identical fingerprints. Furthermore, fingerprints are easily obtained and are often left on surfaces touched or handled by an individual making them ideal for crime and missing person investigations.

Although fingerprints provide a reliable means of establishing the identity of an individual, their use presents its own vulnerabilities.

There are many applications where a secured identity is useful, e.g. for bank account access; security risk area access, e.g. for defense and secret or potentially dangerous research and development; restricted materials obtainment, e.g. munitions and other weapons and potentially dangerous chemicals and biologic materials; and personal information security, e.g. medical records and information. As an example, in healthcare applications, "health cards" provide a convenient method to expedite billing and claim processing, The information that can be stored includes medical history, insurance provider information and personal details. Identity theft is a serious problem in this area, as well as others, with an increasing number of patients using stolen identities to seek treatment to which they are not entitled causing financial losses to providers. Biometric identification in this area, e.g. fingerprints, is thus an answer to increasing identity theft.

A current disadvantage of biometric identification is that passwords and tokens such as smart cards can be reissued or revoked easily when they are compromised; however, if a biometric template, e.g. a fingerprint template, is compromised, it cannot be reissued since a person has a limited number of fingerprints. There are also pertinent issues of privacy when are used across several applications or organizations. The major concern is the possible sharing and misuse of fingerprint databases between organizations and agencies without the user's knowledge. Therefore a method and system is required where the privacy and security of fingerprint data is ensured. Further the system should allow re-enrollment and replacement if the original fingerprint data is compromised.

Existing literature in fact suggests "cancelable" or "private" biometrics as a method of securing biometric templates, see e.g. Ratha et al., "Enhancing Security and Privacy in Biometrics-based Authentication System", IBM Systems Journal, Vol. 40, No. 3, pp 614-634, 2001, incorporated by reference as background art. In the Ratha et al. method, the biometric is altered using a deterministic and fixed non-invertible transformation (biometric hashing) before the template is enrolled In order to prevent compromise of fingerprint data, hashed values of fingerprints may be used. A hash function is a transformation that takes an input string and returns a value, which is called the hash value. Hash functions can be non-invertible and it make it virtually impossible to recover the original fingerprint from the hash value. Recently Biometric systems like fingerprints have been used for authentication and identification purposes. Biometrics, though proven to be more secure and efficient than password-protected systems are probabilistic and not all-or-none like passwords. Even a slight change in the acquisition of a fingerprint can lead to a totally different hash value, which might not and probably will not match the stored template. The possibility that a database with biometric data is compromised is also one of the main concerns in implementing biometric identification systems. Also, biometric systems if compromised cannot be changed, as e.g. fingerprint is unique to a person and if compromised cannot be replaced by a new one. A system that is capable of doing this will be a cancelable biometric system. We have devised a system for biometric data, in particular fingerprint data, to be stored and transmitted securely. In addition, it can be cancelled in case the transmitted data is compromised.

To the best of our knowledge, there is no existing system in the field. Existing fingerprint systems are not secure and identification/authorization is carried out on the actual template of the fingerprints stored. This leads to severe security concerns if the database is compromised. Whereas a patented technology 'Biometric Encryption' by Soutar et al (U.S. Pat. Nos. 5,680,460, 5,712,912, 6,219,794 and 5,790,668) describes secure key management using biometrics for encryption, it uses biometrics in securing keys and PINS and matching is based on the image of the fingerprint. Also the fingerprint image is encrypted and during matching decrypted back. Thus, it is not compliant to industry standards of minutiae matching and also the actual fingerprint is exposed during matching. In Bioscrypt the whole fingerprint image is considered. The problem we are solving is the securing the biometric data itself and in addition make it a cancelable one. Davida et al. (cited in 18-b below) presented an authentication algorithm based on error correcting codes, which have been used in communication systems and barcodes. However, amount of error correction is very limited and possible only if the data can be represented in some ordered fashion, which is not practical for biometric systems.

The situation we are facing here is analogous to a password based authentication system where we would like successful authentication even if the password provided is almost same. Is it possible to construct a person authentication algorithm if we allow the password to change slightly? Error correcting codes [8] have successfully been utilized in such situations of recovering changed data and their use might be appropriate here. Indeed, Davida et al.[2] presented an authentication algorithm based on error correcting codes. In this algorithm, error correcting digits are generated from the biometric data and some other verifying data, and stored in the database. During authenticating stage, possibly changed biometric data is combined with stored error-correcting digits and error correction is performed. The amount of correction required serves as a measure of the authentication success. This algorithm was later modified as fuzzy commitment scheme in the work of Juels and Wattenberg [5] and some of its properties were derived. Kuan et al. [7] presented a method for extracting cryptographic keys from dynamic handwritten signatures. A similar approach for face templates was presented by Kevenaar et al. [6] in which they generate binary feature vectors from biometric face data that can be protected by using helper data introduced into this bit sequence.

In fingerprint based biometric authentication systems, minutiae based matching has become a de facto standard. A fingerprint is made of a series of ridges and furrows on the surface of the finger. The uniqueness of a fingerprint can be determined by the pattern of ridges and furrows as well as the minutiae points. Minutiae points are local ridge characteristics that occur at either a ridge bifurcation or a ridge ending. Correlation based techniques have proven to be inefficient and at times infeasible being highly sensitive to translation and rotation. The task of fingerprint matching requires that the two prints be aligned in the best possible alignment. After alignment, the number of matching minutiae points determine how good the match is. In our work we use ideas similar to [3] to combine results of localized matchings into the whole fingerprint recognition algorithm. In that work localized matching consists of matching minutia triplets using such features as angles and lengths between minutia points. For each minutia feature vector of length 3 $(x,y,\theta)$ and its two nearest neighbors, a secondary feature vector of length 5 is generated which is based on the Euclidean distances and orientation difference between the central minutia and its nearest neighbors. Matching is performed on these secondary features. In contrast, for localized matchings in this work we keep only limited information about matched neighborhoods, so that minutia positions cannot be restored. Global matching is essentially finding a cluster of localized matchings with similar rotation(r) and transformation(t) parameters. It seems that proposed algorithm of Uludag and Jain[13] might also use this 2-stage technique.

Thus none of the approaches previously discussed can directly be extended to fingerprints. Fingerprint data with minutia positions as features presents additional challenges for designing hashes. Minutia sets of two fingerprints usually do not coincide, it has been nearly impossible to introduce some order in a minutia set, and global transformation parameters are usually present between corresponding minutiae. Error correcting codes require that the original sequence be in some ordered fashion in order to locate and then try to correct the errors in the modified sequence. A fuzzy vault algorithm (Juels and Sudan [4]) improves upon a fuzzy commitment scheme in trying to solve challenges and also uses error-correcting codes. The security of the algorithm relies on the addition of chaff points, or, in the case of fingerprint vault, false minutia points. The attacker would try to find a subset of points well intersecting with non-chaff point set. Thus more chaff points provides better security, but arguably worse vault unlocking performance. The application of fuzzy vault to fingerprint identification appeared in the work of Clancy et al. [1]. That paper showed realistic expectations on the numbers of chaff points and associated attack complexity. The algorithm used the asssumption that fingerprints are aligned, and corresponding minutiae had similar coordinates. To address the frequent impossibility to properly align fingerprint images, Uludag and Jain [13] proposed to use features independent of global rotation and translation. It is still unclear if their approach will work. Soutar et al. [10] took another approach to secure fingerprint biometrics. The algorithm operates on images by constructing special filter in Fourier space encoding key data. The data can be retrieved only by presenting similar fingerprint image to the decoder. The matching procedure is correlation based, thus translations of images are possible but not rotations. The main difficulty in producing hash functions for fingerprint minutiae is the inability to somehow normalize fingerprint data, for example, by finding specific fingerprint orientation and center. If fingerprint data is not normalized, then the values of any hashing functions are destined to be orientation/position dependent.

A major difficulty in producing hash functions for fingerprint minutia is thus the ability to somehow normalize fingerprint data, for example by finding specific fingerprint orientation and center. If fingerprint data is not normalized, then the values of any hashing functions are destined to be orientation, position, size dependent.

SUMMARY OF THE INVENTION

A method for obtaining, hashing, storing and using fingerprint data related to fingerprint minutia including the steps of:
 a) determining minutia points within a fingerprint,
 b) determining a plurality of sets of proximate determined minutia points,
 c) subjecting a plurality of representations of the determined sets of minutia points to a hashing function, and
 d) storing resulting hashed values for fingerprint matching.

DETAILED DESCRIPTION OF THE INVENTION

Figure 1:
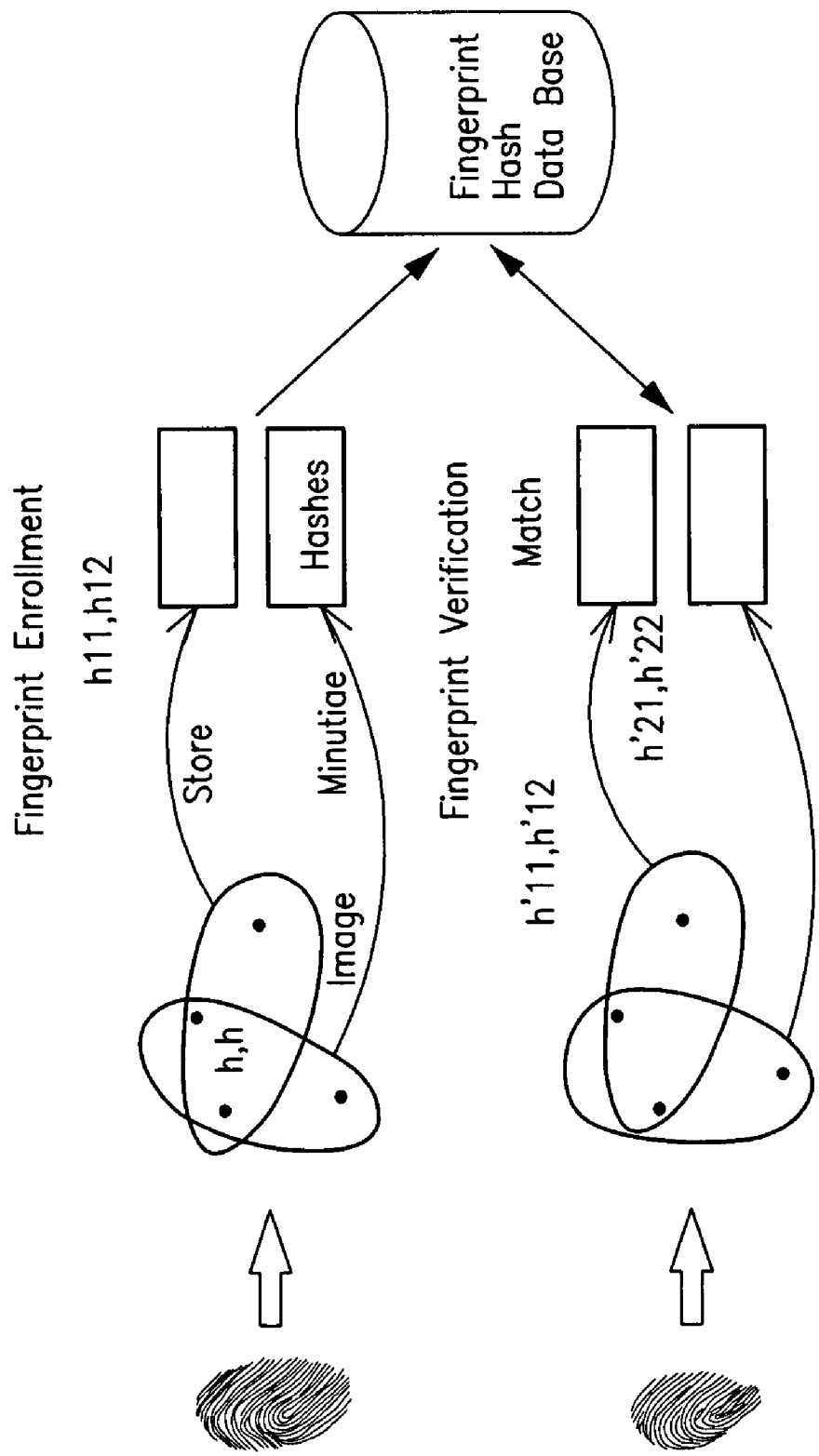
FIG. 1. Shows a pictograph of securing fingerprint information.

The invention is a method and apparatus to secure fingerprint templates by using innovative hash functions. Such hash functions can be utilized for any biometric modality where the information is unordered as in the case of minutia on fingerprints. We have successfully implemented a secure authentication system with performance comparable to plain matching systems. We have also presented methods to cancel and reissue the biometric and to personalize the hash values based on keys that could potentially be derived from other biometric traits.

Securing biometrics databases from being comprised is one of the most important challenges that must be overcome in order to demonstrate the viability of biometrics based authentication. In this paper we present a novel method of hashing fingerprint minutia and performing fingerprint identification in the hash space. Our approach uses a family of symmetric hash functions and does not depend on the location of the (usually unstable) singular points (core and delta). In fact, all approaches of hashing minutia and developing a cancelable system described in the literature assume the location of the singular points. This assumption is unrealistic given that fingerprints are very often only partially captured by the commercially available sensors. The Equal Error Rate (EER) achieved by our system is about 3%. We also present the performance analysis of a hybrid system that has an EER of about 2% which is very close to the performance of plain matching in the minutia space.

We have now devised a system for biometric data in general and fingerprint data in particular, to be hashed, and the biometric identification to be performed using hashed biometric data. We present a method of hashing fingerprint minutia information and performing fingerprint identification in a new space. Only hashed data is transmitted and stored in the server database, and it is not possible to restore fingerprint minutia locations using hashed data. This keeps the actual fingerprint safe from any possible attacks. In addition to this, in case the hashed database is compromised, we can calculate a different set of hash functions from the original fingerprints making the biometric system a cancelable/revocable one. Our system is novel and a pioneering work in this field. It is the only existing system of achieving the mentioned goals with considerable accuracy. In our system any biometric in general and fingerprint in particular, is represented in another space and hashed. Once the hashed data is generated, the actual biometric is stored offline and safe from any attack. Only this hashed data is stored in the server database and transmitted over the network. Identification can be carried out on the hashed data and the actual database is never used. In case the hashed data is compromised, we can generate a new set of hash functions and create a new-hashed database from the original fingerprints. Thus our system has the advantage of securing the biometric data itself and getting rid of usage of PINS and keys.

As previously discussed, a major difficulty in producing hash functions for fingerprint minutia is the ability to somehow normalize fingerprint data. The finding of specific fingerprint orientation and center, as used in the prior art, is not acceptable since the fingerprint itself. If fingerprint data is not normalized, then the values of any hashing functions are destined to be orientation and position dependent. The way to overcome this is to have hash functions, as well as the matching algorithm, deal with normalized transformations of fingerprint data.

In accordance with the invention, fingerprint data is normalized by using proximate sets of minutia points and a function may be applied to the proximate sets of minutia points to obtain data representative of the sets. This data is subjected to a hashing function that is preferably, but not essentially, a non-invertible function to obtain hashed data.

Figure 2:
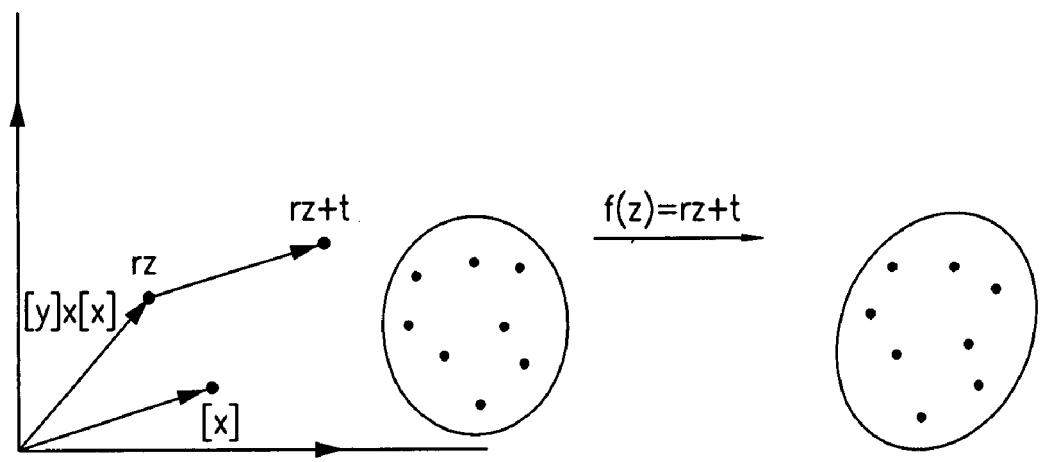
FIG. 2. Shows transformation of minutiae as represented in the complex plane.

Alternatively, non-symmetrical hashing functions may be used by searching for such applicable functions. Matching for non-symmetrical hash functions can use pattern matching techniques, e.g. trained function matching (h,h') which outputs most likely parameters r an t given two sets of hash values from two fingerprints utilizing algebraic relationships between their hash values. Non-algebraic pattern matching can also be used. Selection based upon geometric characteristics of each minutia set can also be used Therefore, in accordance with the present invention, it has been surprisingly found that locations of ridge branch points and ridge terminus points, commonly called minutia, and other fingerprint information, e.g. gray scale ridge number, and ridge inversions, for convenience also included within "minutia" herein, may be represented as complex numbers $\{c_1\}$. A series of complex numbers representing proximate minutia points may then mathematically treated (transformed) in another space to collapse the series to a single three coordinate point representing the minutia point relationship in a three dimensional space. In subjecting the complex numbers to mathematical treatment in another space, it may be assumed that two fingerprints of the same finger can have different position, rotation, and scale coming from possibly different scanners and different ways to put the finger on the scanner. Thus the transformation of one fingerprint to the other can be described by the complex function:

$$f(z)=rz+t.$$

where $z=x+yi$, $r$=rotation in polar coordinates from a base line and $t$=translation See e.g. FIG. 2.

The result is that point data from different fingerprints, treated by the function are normalized both rotationally and translationally for the first time without requirement for later reference to the actual fingerprint itself.

In the present invention hash functions and corresponding matching algorithms are constructed so that this transformation function is taken into account. Additionally a specific order of minutiae cannot be set so that our hash functions are made independent of this order. We thus preferably use symmetric, generally simple exponential, complex functions as the hash functions.

The hashing function is preferably non-invertible. The invention also includes subjecting another fingerprint to steps a) through c) and subjecting representations of resulting sets of proximate points to the same hashing function and comparing with the stored hashed values to determine whether there is a match. The hashing function may be a symmetrical or non-symmetrical hashing function, e.g. the hashing function may be a symmetric function of sets of minutia coordinates having possible complex plane representation.

The hashing function is applied to transformed minutia points in a set. The hashing function may be a rotation independent scalar function of minutia coordinates in a set. Hashed data may used for comparison without the original fingerprint. Searching for data that matches the hashed values for the another fingerprint, within the stored hashed values may utilize algebraic relationships between hash values or may utilize non-algebraic pattern matching methods. An additional hash function may be selected and used based upon geometric characteristics of each set of minutia points. The hash function may be non-invertible or may be invertible. The hash function is individually chosen for each individual having stored fingerprint hash values and the additional hash function may be chosen for each individual having stored fingerprint hash values. Additional non-minutia information may be obtained related to the fingerprint and is used along with minutia information for calculating hash values.

As a specific example, given n minutia points $\{c_1, c_2, \ldots, c_n\}$ the following m symmetric hash functions can be constructed.

$$h_1(c_1, c_2, \ldots c_n) = c_1 + c_2 + \ldots + c_n$$

$$h_2(c_1, c_2, \ldots c_n) = c_1^2 + c_2^2 + \ldots + c_n^2$$

$$\ldots$$

$$h_3(c_1, c_2, \ldots c_n) = c_1^m + c_2^m + \ldots + c_n^m$$

Suppose that another image of the fingerprint is obtained through the above described transformation $f(z)=rz+t$, thus locations of corresponding minutia points are $c'_i = f(c_i) = rc_i + t$. Hash functions of the transformed minutiae can be rewritten as:

$$h_1(c'_1, c'_2, \ldots c'_n) = c'_1 + c'_2 + \ldots + c'_n \quad (2)$$
$$= (rc_1 + t) + (rc_2 + t) + \ldots + (rc_n + t)$$
$$= r(c_1 + c_2 + \ldots + c_n) + nt$$
$$= rh_1(c_1, c_2, \ldots c_n) + nt$$

$$h_2(c'_1, c'_2, \ldots c'_n) = c'^2_1 + c'^2_2 + \ldots + c'^2_n$$
$$= (rc_1 + t)^2 + (rc_2 + t)^2 + \ldots + (rc_n + t)^2$$
$$= r^2(c_1^2 + c_2^2 + \ldots + c_n^2) +$$
$$2rt(c_1 + c_2 + \ldots + c_n) + nt^2$$
$$= r^2 h_2(c_1 + c_2 + \ldots + c_n) +$$
$$2rh_1(c_1 + c_2 + \ldots + c_n) + nt^2$$

We can denote the hash values of the minutia set of one fingerprint as:
$h_i = h_i(c_1, c_2, \ldots c_n)$ and hash values of corresponding minutia of another fingerprint as $h'_{i=h'i}(c'_1, c'_2, \ldots, c'_n)$. Equations 2 now become:

$$h'_1 = rh_1 + nt$$

$$h'_2 = r^2 h_2 + 2rth_1 + nt^2$$

$$h'_3 = r^3 h_3 + 3r^2 th_2 + 3rt^2 h_1 + nt^3 \quad (3)$$

Equations 3 have two unknown variables r and t. If errors introduced during fingerprint scanning and minutia search are taken into account, the relationship between hash values of enrolled fingerprint $\{h_1, \ldots, h_m\}$ and hash values of test fingerprint $\{h'_i, \ldots, h'_m\}$ can be represented as $$h_i = f_i(r, t, h_1, \ldots, h_m) + \epsilon_i \quad (4)$$

The matching between enrolled fingerprint $\{h_1, \ldots, h_m\}$ ands hash values of test fingerprint $\{h'_1, \ldots, h'_m\}$ consists in finding r and t that minimize errors $\epsilon_i$. During algorithm implementation minimization of error functions $\epsilon = \Sigma \alpha_i |\epsilon_i|$ where weights $\alpha_i$ were chosen empirically.

The hash value for data completely changes even if a single character in a password is changed. Hashing is still feasible in case of passwords because the authentication is an all-or none system and access is granted only if the entire password entered is correct. Also, in password protected systems, in case the password database is compromised, a new set of passwords can be generated or set up. Biometric systems, though proven to be more secure and efficient than password protected systems, are probabilistic and not all-or none like passwords. Authentication is based on scores that can vary anywhere between 0-100%.In case biometric data is hashed, even a slight change in the acquisition of the biometric can lead to a totally different hash value which might not match the original within the same matching threshold as that of unhashed ones. Thus in the case of fingerprints, the hash-based system should possess the following:

similar fingerprints should have similar hash values
rotation and translation of original template should not have a big impact on hash values
possibly partial fingerprints should be matched.

The way to overcome this difficulty is to have hash functions as well as matching algorithm deal with transformations of fingerprint data.

We have developed a method for biometric data which is similar to password encryption and hashing. Biometric identification is preferably, but not essentially, performed using hashed biometric data instead of the original template. FIG. 1 illustrates the system for fingerprint biometrics. Fingerprints are obtained by a online scanner, the minutia locations are found and hashes of minutia subsets are constructed. The operations of finding minutiae and hashes can potentially be incorporated into a scanner. Only the hashes then will need to be transmitted and stored in the database. During verification, new hash values are produced by the scanner and are matched with those stored in the database. Matching can be performed either on the client or on the server.

Although other patterns of minutia can be used in accordance with the invention, e.g. parallelograms and pentagons, the simplest to use is a triangular pattern. As an example, let us assume that we compute a hash value for each triplet of minutiae $(c_1, C_2, C_3)$. For each such triplet, we can choose from one of several symmetric hash functions such as $$h_1(c_1,c_2,c_3)=(c_1+c_2+c_3), h_2(c_1,c_2,c_3)=c_1c_2+c_2c_3+c_1c_3,$$
$$h_3(c_1,c_2,c_3)=c_1c_2c_3, \quad h_4(c_1,c_2,c_3)=(c_1-c_2)^2+$$
$$(c_2-c_3)^2+(c_1-c_3)^2 \text{ etc.}$$

Figure 5:
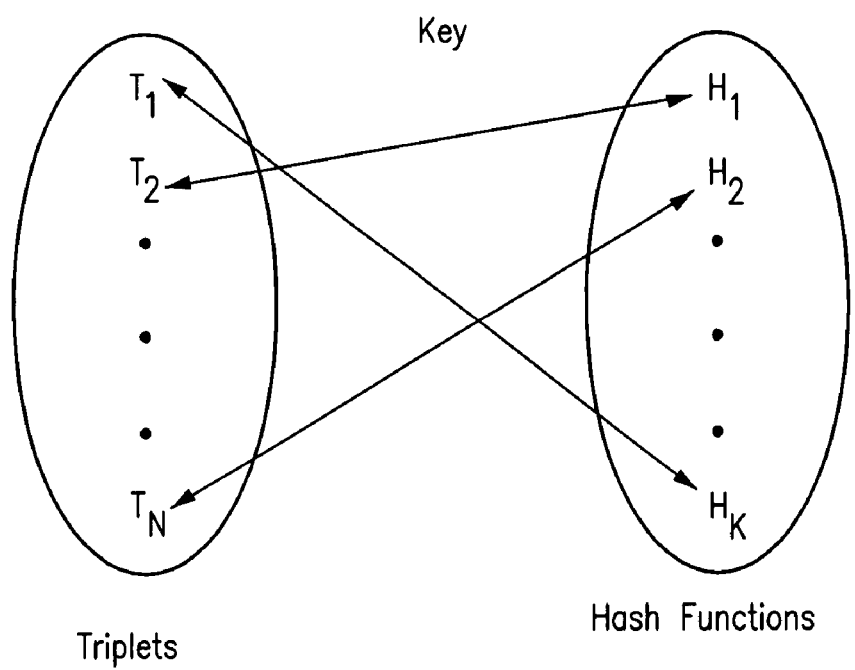
FIG. 5. Shows the association of minutiae triplets with hash functions.

Any linear combination of these functions will also yield a symmetric hash function. Thus for any triplet, we have several functions $h_1, h_2 \ldots h_K$ from which we can derive the transformation. Instead of choosing the hash function in a deterministic way, the complexity of the transformation and hence the resulting security can be multiplied if we could choose several of these hash function simultaneously and in some random order. Thus for each triplet $T_1, T2 \ldots T_N$ we associate a corresponding hash function $H_1, H_2 \ldots H_N$. The association can be based on a secret key K. The key specifies the association between the triplet T and the corresponding hash H as shown in FIG. 5.

However, in order to successfully verify the individual at a later instance, the resulting triplets T1', T2' must also be associated with identical hash functions. The problem occurs because we do not know the association between T1, T1' before hand. (Since that is what we are attempting to do in the matching process). The problem can be solved by a novel technique outlined in the following.

Figure 6:
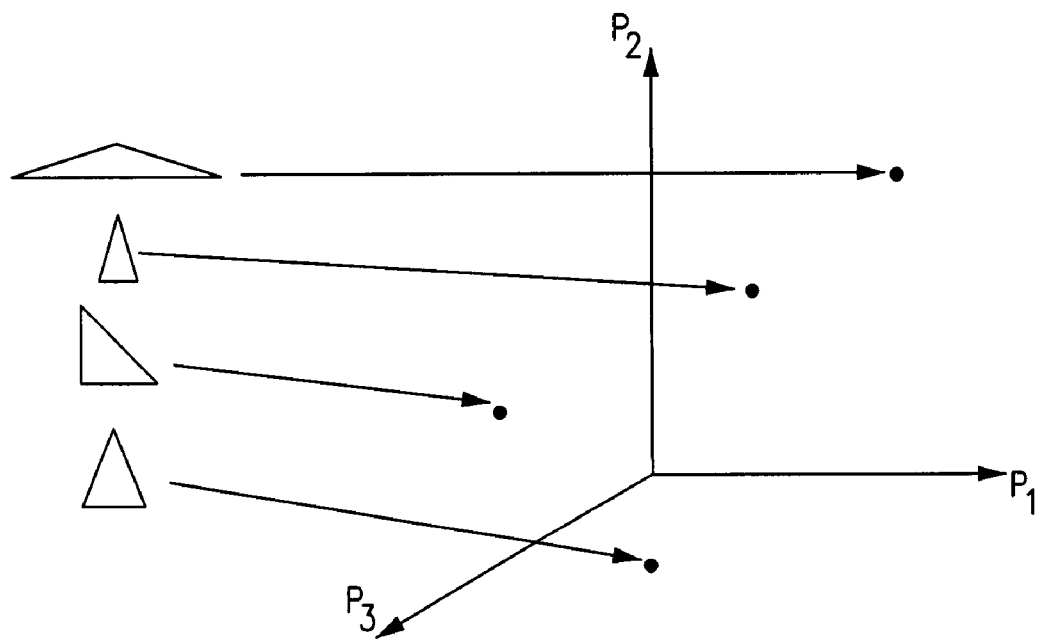
FIG. 6. Shows triangles as points in the parameter space.

Each triangle or triplet T can be represented parametrically by specifying three parameters such as (i) two sides and one angle (ii) one sides and two angles etc. or $p_1, p_2, p_3$ in general. Thus each possible triangle now exists as a point in this parametric space as shown in FIG. 6.

Figure 7:
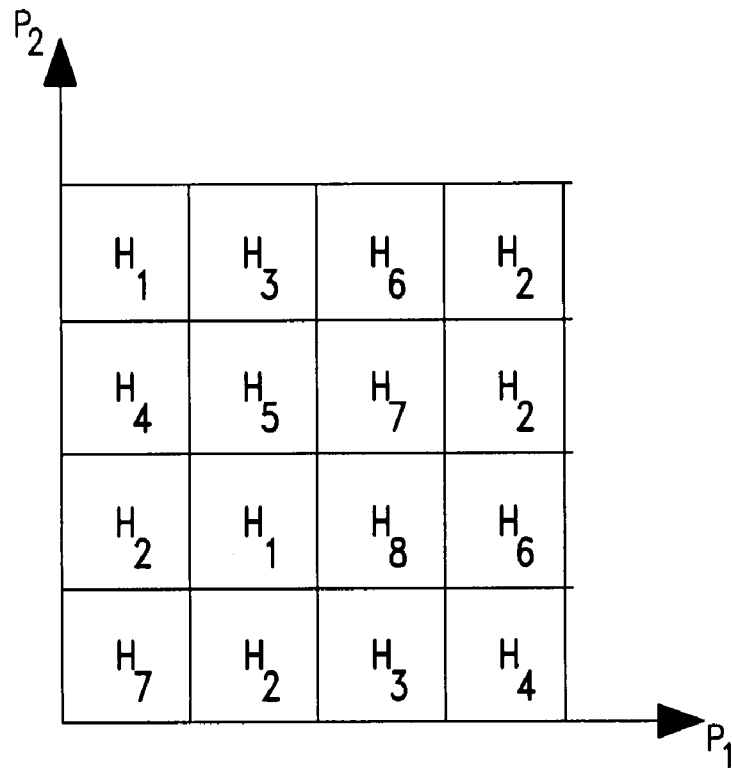
FIG. 7. Shows associating hash functions with cells in the parameter space.

All triangles with similar geometries will lie close together in this parametric space. Thus given any triplet T we determine the point P where it lies in the parametric space. Any triplet T' that is geometrically similar will lie in close proximity of P as shown by the circles in the diagram. Further we divide the parameter space into non-overlapping cells as shown (the cells are shown in 2D for simplicity). To each cell we assign a specific hash function. The association between the hash function and the cell are now contained in the secret key, e.g as shown in FIG. 7.

Two instances of the key are as shown. The length of the key is determined by how we subdivide the triangle space into cells. Let us currently assume that there are C such cells in all.

| H | H | H | H | H | H |
|---|---|---|---|---|---|
| 2 | 4 | 8 | 1 | 3 | 1 |
| H | H | H | H | H | H |
| 3 | 2 | 7 | 3 | 1 | 6 |

This arrangement solves the original problem of triplet association. If a triplet T exists in the reference fingerprint and appears at T'(T with slight distortion) in another instance of the print, it falls in close proximity of the original triplet in the triangle space. Due to the spatial proximity it also falls in the same cell as the original triplet T and hence gets assigned the same hash function as before due to quantization of the triangle space.

The proposed solution increases the security of the hashing function by rendering them immune to brute force attack. While the number of symmetric functions possible for each triplet is clearly infinite, it is not clear at this point of time as to how many symmetric functions can be chosen such that the transformation is still meaningful, but it can be assumed to be some finite (perhaps large) number N. For somebody who has the original biometric, the task of circumventing the system reduces to trying out all of the N hash functions. By introducing the key K, there are N possible hash functions for each cell in the triangle space. Thus the total number of possible hash combinations is now N×N×N . . . (C times)=$N^C$. Thus by introducing the secret key K, we are exponentially multiplying the total possibilities of hash functions and increasing the computational complexity of a brute force attack by the same amount.

Unlike the fingerprint vault algorithm[1] our algorithm performs hashing of not only enrolled fingerprints, but of test fingerprints also. Thus hashing can be incorporated into a scanner, and original fingerprint data will never be transmitted nor stored in the database.

As described earlier, a small change in the input to a hash function changes the hash value considerably. This change could be information missing from the original input, added noise to the input or a change in the order of the input. A certain class of hash functions can, however, be formulated that are invariant to the order in which the input pattern is presented to the hash function. Such hash functions are known as order-independent or symmetric hash functions. Consider an input sequence X=x1x2x3 . . . xn. We can have two hash functions $$H(X)=k1x1+k2x2 \ldots +knxn, k1\_k2\ldots\_kn \quad (1)$$

$$Hm\ sym(X)=x1m+x2m \ldots +xnm \quad (2)$$

As we observe, if the order of the input is changed to X=x2x3xn . . . x1, 1 yields a different hash value where as 2 remains unchanged. We can generate similar hash functions that are symmetric. Moreover, arbitrary combinations of more than one hash function yield other hash functions. Thus, we can have a whole family of symmetric hash functions by combining together elementary symmetric functions of $$2: Hsym\ f(X)\_=f(H1sym(X), \ldots, Hn\ m(X)).$$

This property of the symmetric hash functions can be exploited to our purpose in the fingerprint minutiae or any set of unordered points.

Therefore, uniquely, we represent minutia points as complex numbers $\{ci\}$. We assume that two fingerprints of the same finger can have different position, rotation and scale, coming from possibly different scanners and different orientation of finger on scanner. Thus the transformation of one fingerprint to the other can be described by the complex function f (z)=rz+t (FIG. 2). In our approach we construct hash functions and corresponding matching algorithm, so that this transformation function is taken into account. Additionally we cannot set specific order of minutiae, so we want our hash functions be independent of this order. Thus we consider symmetric complex functions as our hash functions.

Specifically, given n minutia points $\{c1, c2, \ldots, cn\}$ we construct following m symmetric hash functions $$h1(c1, c2, \ldots, cn)=c1+c2+\ldots+cn$$

$$h2(c1, c2, \ldots, cn)=c2+c2+\ldots+c2$$

$$hm(c1, c2, \ldots, cn)=cm+cm+\ldots+cm \quad (3)$$

If the number of hash functions m is less than the number of minutia points n participating in the construction of hash function, it is not possible to restore original minutia positions given hash values.

Suppose that the another image of the fingerprint is obtained through above described transformation f (z)=rz+t, thus locations of corresponding minutia points are c_=f (ci)= rci+t. Hash functions of the transformed minutiae can be rewritten as:

$$\begin{aligned}
h1(c\_, c\_2, \ldots, c\_n) &= c\_ + c\_ + \cdots + c\_n \\
&= (rc1+t) + (rc2+t) + \cdots + (rcn+t) \\
&= r(c1+c2+\cdots+cn) + nt \\
&= rh1(c1, c2, \ldots, cn) + nt
\end{aligned} \quad (4)$$

$$\begin{aligned}
h2(c\_1, c\_, \ldots, c\_n) &= c\_2 + c\_2 + \cdots + c\_2 \\
&= (rc1+t)2 + (rc2+t)2 + \cdots + (rcn+t)2 \\
&= r2(c21 + c2 + \cdots + c2n) + \\
&\quad 2rt(c1 + c2 + \cdots + cn) + nt2 \\
&= r2h2(c1, c2, \ldots, cn) + \\
&\quad 2rh1(c1, c2, \ldots, cn) + nt2
\end{aligned}$$

Let us denote the hash values of the minutia set of one fingerprint as hi=hi(c1, c2, . . . , cn) and hash values of corresponding minutia set of another fingerprint as:

$$h\_=hi(c\_1, c\_2, \ldots, c\_n).$$

Equations 4 now become:

$$h\_1=rh1+nt$$

$$h\_2=r2h2+2rth1+nt2$$

$$h\_3=r3h3+3r2th2+3rt2h1+nt3 \quad (5)$$

Equations 5 have two unknown variables r and t. If we take into account errors introduced between hash values of enrolled fingerprint $\{h1, \ldots, hm\}$ and hash values of test fingerprint $\{h\_1, \ldots, h\_m\}$, they can be represented as:

$$h\_i=fi(r,t,h1, \ldots ,hn)+\_i \quad (6)$$

The matching between hash values of enrolled fingerprint $\{h1, \ldots, hm\}$ and hash values of test fingerprint $\{h\_1, \ldots, h\_m\}$ consists in finding r and t that minimize errors_i. During algorithm implementation we considered minimization of error functions_=αi|_i|, where weights αi were chosen empirically.

It turns out that trying to use hash functions with respect to the minutia set of whole fingerprint is impractical. Even the small difference in minutia sets of two prints of the same finger will produce significant difference in hash values. Additionally, the higher order hash values tend to change greatly with the small change in positions of minutia points. To overcome these difficulties we considered using hash functions for matching localized sets of minutia, and global matching of two fingerprints as a collection of localized matchings with similar transformation parameters r and t. As in base fingerprint matcher[3] the localized set is determined by a particular minutia and few of its neighbors. The hashes are calculated for each localized set. Total hash data extracted from fingerprint is a set of hashes $\{hi,1, \ldots, hi,m\}$, i=1, . . . , k, where k is the total number of localized minutia sets.

During matching of two hash sets we first perform a match of all localized sets in one fingerprint to all localized sets in another fingerprint. The matches with highest confidences are retained. Then, assuming in turn that a particular match is a correct match, we find how many other matches have similar transformation parameters. The match score is composed from the number of close matches and confidences of those matches.

We tested our system on an F V C 2002's DB1 database. The dataset consisted of 110 different fingers and 8 impressions for each finger. There were a total of 880 fingerprints (388 pixels by 374 pixels) at 500 dpi with various image quality. We followed the protocols of F V C 2002 to evaluate the FAR(False Accept Rate) and FRR(False Reject Rate). For FRR (8*7) the total number of genuine tests is 2*100=2800. For FAR, the total number of impostor tests (100*99) is 2=4950.

We carried out experiments with different configurations, using different number of minutia points(n) and hashing functions(m). We tried out the configurations as follows:

1) n=2, m=1: For each minutia point we find its nearest neighbor, and the hash function h(c1, c2)=c1+c2
2) n=3, m=1: For each minutia point we find two nearest neighbors and the hash function h(c1, c2, c3)=c1+c2+c3
3) n=3, m=2: For each minutia point find three nearest neighbors, and for each minutia triplet including original minutia point con struct two hash functions using the formula hm(c1, c2, ..., cn)=cm+cm+ ... +cm where m=1,2.

We use similar formulae for directions.

Configuration 3 for the experimental setup can be explained as follows: Given a minutia triplet represented by complex numbers (c1, c2, c3), we find the center of the triangle formed by this triplet. The center is represented by the complex number T=c1+c2+c3. Such triangle centers for all minutia triplets are now used for hashing, performing the alignment between the template and the test fingerprint and also to calculate the matching scores. Thus, if a fingerprint is represented in the minutia space by a set of minutia points {m1, m2, ..., mn}, this operation maps it into a new space where it is now represented as a set of triangle centers {T1, T2, ..., Tk}. The task of reversing this hash function would be to find out the actual minutia point locations given these triangle centers. We compared performance with fingerprint matching algorithm developed in [3] and using same set of fingerprints with identically extracted minutiae points. Also, since in configurations 1 and 2 we simply get another set of minutia points, we used matching algorithm of [3] to perform matching.

The currently achieved equal error rate (point where FAR=FRR) of proposed algorithm is ~3%.

The equal error rate (EER) for plain matching is ~1.7%. (See Table 1).

TABLE I

|  | Plain | Secure | Hybrid |
| --- | --- | --- | --- |
| Avg. points matched | 25.90 | 57.50 | 24.55 |
| EER % | 1.7 | 3.0 | 2.0 |

Figure 3:
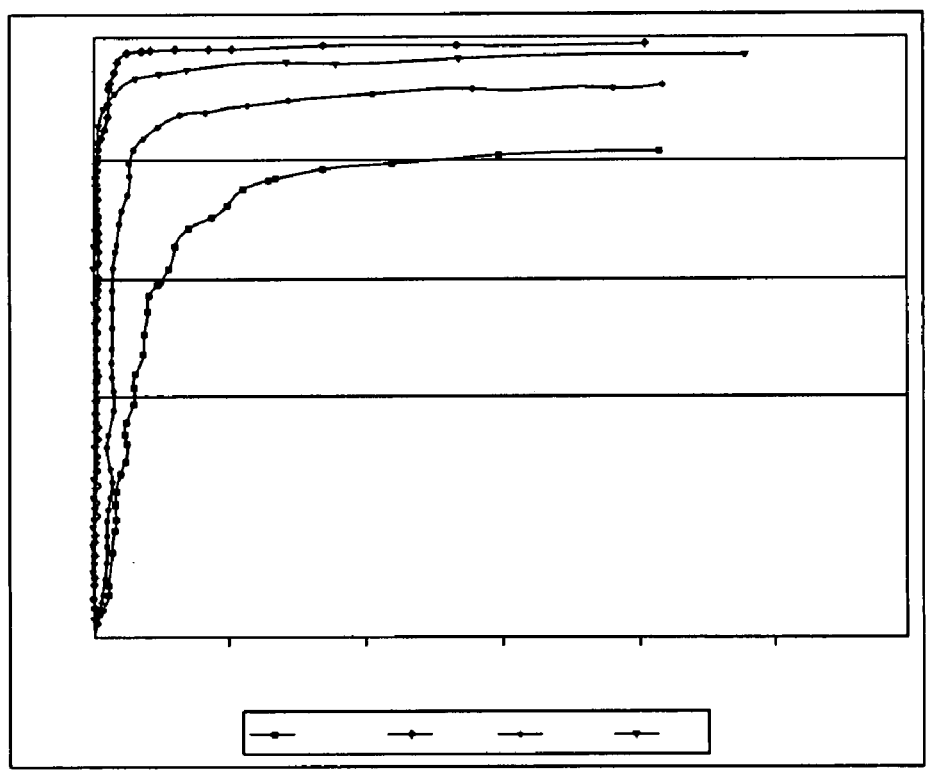
FIG. 3. Shows ROC Curves for a baseline system and the different experimental configurations.

The ROC characteristics of the baseline system and the different configurations of our system are shown in FIG. 3.

As noted the accuracy of the secure system is slightly lesser than the baseline system. Nevertheless, the benefits of securing fingerprint data can easily outweigh the performance loss in many applications. Performance loss would mean more strict decisions on matching, and more frequent repeat matching attempts. Arguably many people will trade off the assurance on their fingerprint template privacy for the inconvenience for performing repeated fingerprint scans.

The main purposes of the proposed algorithm is to normalize data and to conceal original fingerprint and minutiae locations from an attacker. Is it possible to reconstruct minutia positions given stored hash values? Since the number of hash values for each local minutia set is less than number of these minutiae, it is not possible to get locations using only information of one local set. On the other hand, it seems possible to construct a big system of equations involving all hashes (hashes of only first order might be considered for linearity). The biggest problem in constructing such system is that it is not known which minutia participated in the creation of particular hash value.

Figure 4:
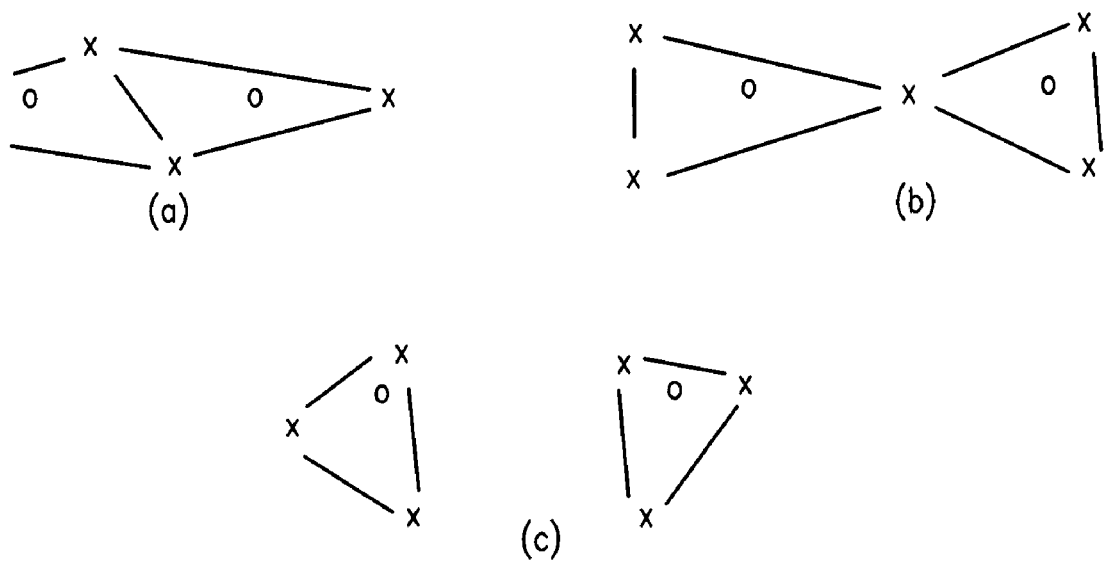
FIG. 4. shows how different numbers of minutiae(crosses) can participate in the creation of two triplet centers(circles).

The problem is illustrated in FIG. 4. Two triplet centers are formed from 4, 5 and 6 minutia points. Thus during constructing an equation system for finding minutia positions, we have a problem of deciding how many minutiae should be, in addition to matching minutia to triplet centers.

Hill-climbing type attacks[12] will probably have more difficult time to make a match since varying minutia position might have effect on few triplets, thus influencing matching score in a more complex way. Also, we believe that even if an attack suceeded and a match is found, the resulting minutiae locations will be different from original. In this situation, change of hashing algorithm will make the reconstructed fingerprint unmatchable.

The proposed hashing of fingerprint templates eliminates the possibility of an intruder learning original minutia positions. Though we consider it as an extremely difficult task, an intruder might construct an artificial template producing similar hash values, but having different minutia positions. Thus we need to expand our algorithm to make fingerprint hashes cancelable. This can be achieved by reenrolling persons using different set of hash functions.

In order to enhance the security, systems often implement a two-level authentication where a user in addition to the biometric provides a key which is stored in a card or by entering on a keypad. Also, this key can be reissued in case of a potential compromise. In this section we present ways to increase the security of the hashing method by an exponential factor. This can be done by embedding a secret key into the hashing process. The key may be based on a token that the user carries or a password that the user remembers. It may even be based on another biometric, thus making the key personal. To achieve a cancelable biometric algorithm we need to provide a way to automatically construct and use randomly generated hash functions. Presented set of hash functions is an algebraic basis in the set of polynomial symmetric functions. Thus, we were able to express hash functions of transformed minutia set through original set of symmetric functions. This is a clue to constructing other similar hash functions. Essentially we can take arbitrary algebraic basis of symmetric polynomials of degree less than or equal to m, $\{s_1, \ldots, s_m\}$ as our hash functions. Then the hash functions of the transformed minutiae, $s_i(rc_1+t, \ldots, rc_n+t)$, will still be symmetric functions of the same degree with respect to variables $c_1, \ldots, c_n$. Thus, hashes of transformed minutia could be expressed using original hashes, $s\_i=s_i(rc_1+t, \ldots, rc_n+t)=F_i(r, t, s_1, \ldots, s_m)$ for some polynomial functions $F_i$. These equations will allow matching localized minutia sets, and finding corresponding transformation parameters.

Let us assume that we compute a hash value for each triplet of minutiae (c1, c2, c3). For each such triplet, we can choose from one of several symmetric hash functions such as:

$$h1(c1, c2, c3) = (c1+c2+c3)$$

$$h2(c1, c2, c3) = (c1c2+c2c3+c1c3)$$

$$h3(c1, c2, c3) = c1c2c3$$

$$h4(c1, c2, c3) = (c1-c2)2+(c2-c3)2+(c1-c3)2 \text{ etc.}$$

Any linear combination of these functions will also yield a symmetric hash function. Thus for any triplet, we have several functions h1, h2 . . . hk from which we can derive the transformation. Instead of choosing the hash function in a deterministic way, the complexity of the transformation and hence the resulting security can be multiplied if we could choose several of these hash function simultaneously and in some random order. Thus for each triplet T1, T2 . . . TN we associate a corresponding hash function H1, H2 . . . HN. The association can be based on a secret key K. The key specifies the association between the triplet T and the corresponding hash H as shown in FIG. 5.

However, in order to successfully verify the individual at a later instance, the resulting triplets T_1,T_2 must also be associated with identical hash functions. The problem occurs because we do not know the association between T1,T_ before hand. To overcome this each triangle or triplet T can be represented parametrically by specifying three parameters such as—two sides and one angle, or one sides and two angles etc. Let us represent these by p1, p2, p3 in general. Thus each possible triangle now exists as a point in this parametric space as in FIG. 6.

All triangles with similar geometries will lie close together in this parametric space. Thus given any triplet T we determine the point P where it lies in the parametric space. Any triplet T_ that is geometrically similar will lie in close proximity of P as shown by the circles in FIG. 6.

Further we divide the parameter space into non-overlapping cells as in FIG. 7 (the cells are shown in 2D for simplicity). To each cell we assign a specific hash function. The association between the hash function and the cell are now contained in the secret key. Assume two instances of the key are H2 H4H8H1 H3H1 and H3H2H7H3H1H6. The length of the key is determined by how we subdivide the triangle space into cells. Let us currently assume that there are c such cells in all. This arrangement solves the original problem of triplet association. If a triplet T exists in the reference fingerprint and appears at T_(T with slight distortion) in another instance of the print, it falls in close proximity of the original triplet in the triangle space. Due to the spatial proximity it also falls in the same cell as the original triplet T and hence gets assigned the same hash function as before due to quantization of the triangle space.

The proposed solution increases the security of the hashing function by rendering them immune to brute force attack.

While the number of symmetric functions possible for each triplet is clearly infinite, it is not clear at this point of time as to how many symmetric functions can be chosen such that the transformation is still meaningful, but it can be assumed to be some finite (perhaps large) number N. For somebody who has the original biometric, the task of circumventing the system reduces to trying out all of the N hash functions. By introducing the key K, there are N possible hash functions for each cell in the triangle space. Thus the total number of possible hash combinations is now N×N×N . . . (c times)=Nc. Thus by introducing the secret key K, we are exponentially multiplying the total possibilities of hash functions and increasing the computational complexity of a brute force attack by the same amount. This key can be based on a biometric such as face or iris or its convolution by some signal. In case of compromise of the database the keys can be reissued and different set of hash functions chosen as shown earlier, thus rendering the biometric system cancelable.

Figure 8:
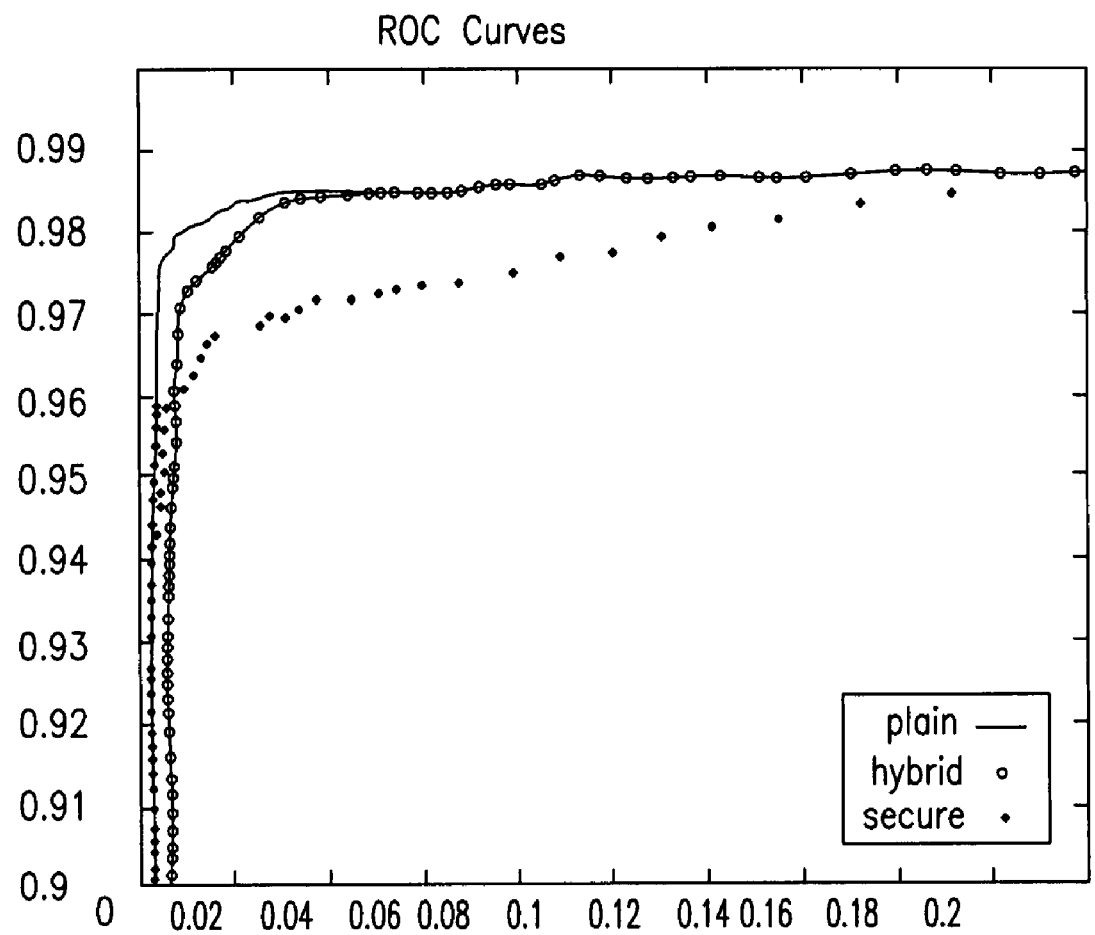
FIG. 8. Shows comparing the ROC curves of plain, secure and hybrid systems.

The loss in the accuracy of the secure system as compared to the plain version could be attributed to various factors such as reduction in the number of points being matched. It should be noted, however, that the total number of hashed values is not reduced in the same proportion since the same minutia can participate in the production of more than one triplet as described in FIG. 3. Thus the total size of stored hash values can be even bigger than the size of original fingerprint template. The decrease in the accuracy might be caused by the loss in information when keeping reduced number of variables based on minutia triplets. For every three neighboring minutia points we have reduced the number of variables to 4 (2 complex numbers) instead of original 6. For example, the average number of minutia matched for a genuine match in the baseline version was observed to be 25.9. In the secure version the average number of triplet centers matched for genuine tests were 57.5. There can be additional reasons for observed performance hit, such as difficulty in matching localized hashed values. In order to evaluate the performance of the secure matching algorithm vis-a-vis the plain matching, we carried out experiments where the transformation parameters were acquired from our algorithm. These r and t parameters were then used as the transformation parameters for the plain version. For this setup, an EER of ~2.0% was achieved. This suggests that the scoring formulae for the secure version requires improvement based on the current techniques. FIG. 8 shows the three curves. As we see the hybrid system performs better than our baseline secure system, however, a slightly worse than the baseline plain system. Table 1 gives a comparison between the three systems. The comparable number of minutia matched in the plain version and the hybrid system suggest that indeed the secure system performs as good in terms of finding the transformation parameters and matching the minutia. This suggests that the performance decrease is in the scoring methodology.

The invention also includes apparatus for obtaining, hashing, storing and using fingerprint data related to fingerprint minutia including apparatus for:

a) determining minutia points within a fingerprint, b) determining a plurality of sets of proximate determined minutia points, and c) subjecting a plurality of representations of the determined sets of minutia points to a hashing function to obtain hashed data.

The apparatus preferably includes a scanner for obtaining scanned fingerprint and also preferably includes a scanner for obtaining minutia A digitizer for digitizing the minutia for input into a transform function is also preferably included. The apparatus includes transmitting apparatus for transmitting obtained hash values to a data base server for fingerprint enrollment, verification, or identification. A computer within the apparatus performs matching of obtained hash values with externally stored hash values.

REFERENCES

The following references are included herein as background art. No admission is made that any of these references constitute prior art impacting the patentability of the invention.

[1] T. Clancy, D. Lin, and N. Kiyavash, "Secure smartcard-based fingerprint Authentication," in ACM Workshop on Biometric Methods and Applications (WBMA 2003), 2003.

[2] G. Davida, Y Frankel, and B. Matt, "On enabling secure applications through on-line biometric identification," in Proc. of the IEEE 1998 Symp. on Security and Privacy, Oakland, Calif., 1998.

[3] T.-Y Jea, V S. Chavan, V Govindaraju, and J. K. Schneider, "Security and matching of partial fingerprint recognition systems," in SPIE Defense and Security Symposium, 2004.

[4] A. Juels and M. Sudan, "A fuzzy vault scheme," in IEEE International Symposium on Information Theory, 2002.

[5] A. Juels and M. Wattenberg, "A fuzzy commitment scheme," in ACM Conference on Computer and Communications Security, 1999,pp. 28-36.

[6] T. Kevenaar, G. Schrijen, M. Veen, A. Akkermans, and F. Zuo, "Face recognition with renewable and privacy preserving binary templates," in Auto ID 2005, Fourth IEEE Workshop on Automatic Identification Advanced Technologies, 2005, pp.21-26.

[7] Y. Kuan, A. Goh, D. Ngo, and A. Teoh, "Cryptogrpahic keys from dynamic hand-signatures with biometric secrecy preservation and replaceability," in Auto ID 2005, Fourth IEEE Workshop on Automatic Identification Advanced Technologies, 2005,pp. 27-32.

[8] W. Peterson and E. Weldon, Error-Correcting Codes, 2nd ed. Cambridge, USA: MIT Press, 1972.

[9] B. Schneier, Applied Cryptography. New York: John Wiley, 1996.

[10] C. Soutar, D. Roberge, A. Stoianov, R. Gilroy and V. Kumar, "Biometric encryption," in ICSA Guide to Cryptography, R. Nichols, Ed. McGraw-Hill, 1999.

[11] S. Tulyakov, F. Farooq, and V Govindaraju, "Symmetric hash functions for fingerprint minutiae," in International Workshop on Pattern Recognition for Crime Prevention, Security and Surveillance, Bath, UK, 2005, pp.30-38.

[12] U. Uludag and A. Jain, "Attacks on biometric systems: a case study in fingerprints," in SPIE-EI 2004, Security, Seganography and Watermarking of Multimedia Contents VI, 2004.

[13] "Fuzzy fingerprint vault," in Proc. Workshop: Biometrics: Challenges Arising from Theory to Practice, 2004, pp. 13-16.

What is claimed is:

1. A method for obtaining, hashing, storing and using fingerprint data related to fingerprint minutia comprising:
   a) utilizing a scanner for obtaining minutia points within a fingerprint,
   b) determining a plurality of sets of proximate obtained minutia points within the fingerprint, and
   c) subjecting the determined sets of proximate minutia points to a hashing function to obtain hashed values for fingerprint matching,
   where the hashing function is a rotation independent scalar function of minutia coordinates in a set.

2. A method for obtaining, hashing, storing and using fingerprint data related to fingerprint minutia comprising:
   a) utilizing a scanner for obtaining minutia points within a fingerprint,
   b) determining a plurality of sets of proximate obtained minutia points within the fingerprint, and
   c) subjecting the determined sets of proximate minutia points to a hashing function to obtain hashed values for fingerprint matching,
   wherein an additional hash function is selected and performed based upon geometric characteristics of each set of minutia points.

3. The method of claim 2 wherein the additional hash function is chosen for each individual having stored fingerprint hash values.

4. A method for obtaining, hashing, storing and using fingerprint data related to fingerprint minutia comprising:
   a) utilizing a scanner for obtaining minutia points within a fingerprint,
   b) determining a plurality of sets of proximate obtained minutia points within the fingerprint, and
   c) subjecting the determined sets of proximate minutia points to a hashing function to obtain hashed values for fingerprint matching,
   wherein the hash function is individually chosen for each individual having stored fingerprint hash values.

5. A method for obtaining, hashing, storing and using fingerprint data related to fingerprint minutia comprising:
   a) utilizing a scanner for determining minutia points within the fingerprint,
   b) assigning values x and y along rectangular planar coordinates x and y to a plurality of the minutia points relative to a baseline,
   c) forming complex numbers $z=x+y_i$ for a plurality of minutia points,
   d) utilizing a computer for subjecting the z's from the minutia points to a transformation function $f(z)=rz+t$, where r is a rotational factor relative to original vector z and t is a translational factor relative to rz, to obtain n transformed points $c_1$ to $c_n$,
   e) determining a plurality of sets of proximate minutia points from points $c_1$ to $c_n$, and
   f) utilizing a computer for subjecting a plurality of the sets to a symmetrical hashing function, and utilizing a computer for storing resulting hashed points to obtain a set of stored points.

6. The method of claim 5 where another fingerprint is subjected to steps a) through e) and resulting sets of proximate points are subjected to the same hashing function and compared with the stored points to determine whether there is a match.

7. The method of claim 6 where only hashed data is used for comparison without the original fingerprint.

8. The method of claim 5 where the hashing function is a sum of the transformed points in the set.

9. The method of claim 5 where the hashing function is a sum of the squares of transformed points in the set.

10. The method of claim 5 where $z=(x^2+y^2)^{1/2}[x/(x^2+y^2)^{1/2}+yi/(x^2+y^2)^{1/2}]$.

11. The method of claim 10 where $z=|z|[x/|z|+yi/|z|$ $(\cos \Theta + \sin \Theta)$ where $\Theta$ is the angle from x to z.

12. The method of claim 5 where $r=|r|(\cos \Phi + i \sin \Phi)$ where $\Phi$ is the rotational angle from z.

13. The method of claim 5 where t is a distance from rz parallel to x.

14. The method of claim 5 where an additional factor is used in the hash function to increase security.

15. The method of claim 5 wherein the hash function is changed to make the fingerprint hashed points revocable.

16. An apparatus for obtaining, hashing, storing and using fingerprint data related to fingerprint minutia comprising a computer containing a program for
   a) determining minutia points within the fingerprint,
   b) assigning values x and y along rectangular planar coordinates x and y to a plurality of the minutia points relative to a baseline,
   c) forming complex numbers $z=x+y_i$ for a plurality of minutia points, d) subjecting the z's from the minutia points to a transformation function $f(z)=rz+t$, where r is a rotational factor relative to original vector z and t is a translational factor relative to rz, to obtain n transformed points $c_1$ to $c_n$,
e) determining a plurality of sets of proximate minutia points from points $c_1$ to $c_n$, and
f) subjecting a plurality of the sets to a symmetrical hashing function, and storing resulting hashed points to obtain stored points.

17. The apparatus of claim 16 where the hash function is a non-invertible hash function.

18. The apparatus of claim 16 wherein the apparatus includes a scanner for obtaining minutia and a digitizer for digitizing the minutia for input into a non-invertible transform function.

* * * * *